United States Patent [19]

Ogata

[11] Patent Number: 4,523,813

[45] Date of Patent: Jun. 18, 1985

[54] ZOOM LENS SYSTEM

[75] Inventor: Yasuzi Ogata, Tokyo, Japan

[73] Assignee: Olympus Optical Co., Ltd., Tokyo, Japan

[21] Appl. No.: 568,144

[22] Filed: Jan. 4, 1984

[30] Foreign Application Priority Data

Jan. 27, 1983 [JP] Japan .................. 58-10544

[51] Int. Cl.³ .................. G02B 9/64; G02B 15/14
[52] U.S. Cl. .................. 350/426; 350/463
[58] Field of Search .................. 350/426, 463

[56] References Cited

U.S. PATENT DOCUMENTS 4,153,338  5/1979  Fujii .................. 350/426
4,367,927  1/1983  Fujii .................. 350/426

FOREIGN PATENT DOCUMENTS 49-2548    1/1974  Japan .
53-132360 11/1978  Japan .
55-13334   4/1980  Japan .
56-19022   2/1981  Japan .

Primary Examiner—John K. Corbin
Assistant Examiner—Rebecca D. Gass
Attorney, Agent, or Firm—Cushman, Darby & Cushman

[57] ABSTRACT

In a zoom lens system comprising a front lens group having negative refractive power and a rear lens group having positive refractive power and designed in such a manner that the airspace between said front lens group and rear lens group is varied for zooming, a zoom lens system comprising a rear lens group consisting of a positive lens component, a positive meniscus lens component, a positive meniscus cemented doublet, a negative lens component and a positive lens component, and having a large relative aperture and favorably corrected aberrations.

7 Claims, 5 Drawing Figures

ZOOM LENS SYSTEM

BACKGROUND OF THE INVENTION (a) Field of the Invention

The present invention relates to a large relative aperture ratio zoom lens system having a focal length on the order of 35 to 70 mm for use with 35 mm single lens reflex cameras.

(b) Description of the Prior Art

Out of zoom lens systems, a certain type consisting of two lens groups comprises a front lens group having negative refractive power, a rear lens group having positive refractive power and a stop arranged in said rear lens group. This type is suited as a wide-angle zoom lens system having a zooming ratio on the order of 2× since it is capable of suppressing to relatively low level the variation of distortion which is known as a defect of the zoom lens systems consisting of four lens groups and permits shortening total length of said zoom lens system. For this reason, researches have recently been made on this type of zoom lens system consisting of two lens groups, making rapid progress in this field and realizing numerous conventional examples.

However, it is difficult to design a zoom lens system so as to have a large relative aperture, and the conventional examples had F numbers of 3.5 at best. For example, the zoom lens systems disclosed by Japanese Unexamined Published Patent Applications No. 2548/74, No. 132360/78 and No. 19022/81 have an F number of 3.5 or a small relative aperture. The small relative aperture of the zoom lens systems comprising two lens groups is traced to their basic composition. Speaking concretely, the front lens group having a strongly negative refractive power remarkably diverges rays, which remarkably enlarges relative aperture of the rear lens group at the stage of incidence on said lens group. As a result, spherical aberration is remarkably undercorrected at the tele position. In a case where the rear lens group is designed as a triplet type, the image side surface of the negative lens element must have a strong power for the purpose of correcting said undercorrected spherical aberration. This power results in curvature of astigmatism characteristics and uneven image plane at the wide position of the zoom lens system. Further, it aggravates coma and degrades contrast, thereby lowering image quality.

SUMMARY OF THE INVENTION

A general object of the present invention is to provide a zoom lens system having favorably corrected aberrations regardless of an F number of 2.8 over the entire zooming range by selecting a basic lens composition of Ernostar type for the rear lens group, designing the positive lens component arranged on the object side of the negative lens component of this lens group as a cemented doublet and reserving a large difference between the refractive indices of the lens elements arranged on both the sides of the cemented surface, thereby giving a function to correct the spherical aberration to said cemented surface and relatively weakening the power of the object side surface of said negative lens component.

The zoom lens system according to the present invention comprises a front lens group having negative refractive power and a rear lens group having positive refractive power, said rear lens group consisting of a positive lens component, a positive meniscus lens component having a surface with a small radius of curvature on the object side, cemented meniscus lens component consisting of a biconvex lens element and a biconcave lens element and having positive refractive power as a whole, a negative lens component having a surface with a small radius of curvature on the image side and a positive lens component having a surface with a small radius of curvature on the image side.

Further, the zoom lens system according to the present invention is so designed as to satisfy the following conditions (1) and (2):

$$0.47 < r_{15}/f_R < 0.53 \quad (1)$$

$$0.1 < n_7 - n_6 \quad (2)$$

Furthermore, the following conditions (3) through (7) should desirably be satisfied to obtain a zoom lens system having more favorably corrected aberrations:

$$1.1 < |f_F|/f_T < 1.24 \quad (3)$$

$$2.15 < f_6/f_R < 3.2 \quad (4)$$

$$0.3 < D/f_R < 0.6 \quad (5)$$

$$10 < \nu_6 - \nu_7 < 25 \quad (6)$$

$$50 < \nu_4, \nu_5, \nu_6 \quad (7)$$

In the conditions mentioned above, the reference symbols are defined as follows:

$f_F$: focal length of said front lens group $f_R$: focal length of said rear lens group $f_6$: focal length of the cemented doublet arranged in said rear lens group $f_T$: focal length of the zoom lens system as a whole at its tele position $r_{15}$: radius of curvature on the image side surface of the negative lens component arranged in said rear lens group D: distance as measured from the object side surface of the cemented doublet to the final lens surface of the rear lens group $n_6$ and $n_7$: refractive indices of both the lens elements of the cemented doublet arranged in said rear lens group $\nu_4, \nu_5, \nu_6$ and $\nu_7$: Abbe's numbers of the object side positive lens component, positive meniscus lens component and both the lens elements of the cemented doublet respectively arranged in said rear lens group Out of the above-mentioned conditions, conditions (1) and (2) are adopted for correcting spherical aberration at the tele position of the zoom lens system. When spherical aberration is corrected only with the image side surface of the negative lens component arranged said rear lens group, this surface has too strong a power as already described above, thereby producing astigmatism, curving coma characteristic and aggravates flare at the wide position. In order to prevent this defect, a large difference is reserved between refractive indices of both the lens elements of the cemented doublet arranged in said rear lens group as defined by the condition (2) so that the cemented surface has a function to correct spherical aberration.

Therefore, if power of the image side surface of the negative lens component arranged in said rear lens group is strong enough to exceed the lower limit of the condition (1) or the lower limit of the condition (2), spherical aberration will hardly be corrected.

The condition (3) defines the basic composition of the zoom lens system according to the present invention. Power of said front lens group exceeding the upper limit of the condition (3) is advantageous for correction of aberrations since such a power can minimize imaging magnification of said rear lens group. However, such a weak power prolongs total length of the zoom lens system, requires longer displacement of said front lens group for focusing the zoom lens system on an object located at a short distance and increases eclipse of the lower rays at the wide position, thereby making it difficult to reserve marginal rays in a sufficient quantity. This results in enlargement of diameter of the front lens component, thereby making it impossible to design the zoom lens system compact.

If the lower limit of the condition (3) is exceeded, in contrast, the front lens group will have too strong a power to correct aberrations favorable.

The condition (5) defines distance as measured from the extreme object side surface to the extreme image side surface of the lens components arranged on the rear side of the stop. If the thicknesses of the lenses are small enough to make the distance shorter than the lower limit of the condition (5), astigmatic difference is increased and image plane characteristic is degraded. If the upper limit of the condition (5) is exceeded, in contrast, total length of the zoom lens system is prolonged, making it difficult to design said lens system compact.

Since chromatic aberration is apt to be varied in a zoom lens system by zooming it, it is necessary to correct the chromatic aberration. Especially in a lens system of Ernostar type, flare due to chromatic aberration is apt to be produced and spherical aberration of g line is apt to be overcorrected especially at the tele position. In order to minimize variation of chromatic aberration, it is basically necessary to favorably correct chromatic aberration in each of the front and rear lens groups. In the rear lens group, height of the paraxial ray is the maximum on the positive lens components arranged on the object side and, therefore, it is necessary to prevent chromatic aberration from being produced by these lens components. The present invention prevents chromatic aberration from being produced by these lens components by selecting Abbe's numbers $\nu_4$, $\nu_5$ and $\nu_6$ for these positive lens components so as to satisfy the condition (7). If this condition (7) is not satisfied, chromatic aberration is produced by these positive lens components and largely varied by zooming the lens system.

Further, the present invention selects a relatively large Abbe's number $\nu_7$ for the negative lens element of the cemented doublet for the purpose of preventing flare due to chromatic aberration from being produced by the cemented surface and adopts the condition (6) for the purpose of favorably correcting paraxial chromatic aberration in the whole lens system. If the upper limit of the condition (6) is exceeded, the difference between $\nu_6$ and $\nu_7$ is too large to select a large Abbe's number $\nu_7$ even when $\nu_6$ is large, thereby allowing flare due to chromatic aberration to be produced. If the lower limit of this condition (6) is exceeded, in contrast, the difference between $\nu_6$ and $\nu_7$ is too small, making it impossible to favorably correct paraxial chromatic aberration in the whole lens system.

The condition (4) defines a characteristic that the cemented doublet has a positive power as a whole. If this cemented doublet has a negative power, chromatic aberration is unbalanced to produce overcorrected chromatic aberration, which cannot be corrected by the lens components arranged later. If the power of the cemented doublet is strong enough to exceed the lower limit of the condition (4), in contrast, the front principal point of the rear lens group is located too deep into the rear lens system, making it impossible to reserve the airspace between the front and rear lens groups at the tele position of the zoom lens system. If the power of the cemented doublet is weak enough to exceed the upper limit of the condition (4), in contrast, coma flare will be aggravated.

DETAILED DESCRIPTION OF THE PREFERRED EMBODIMENTS

Figure 1:
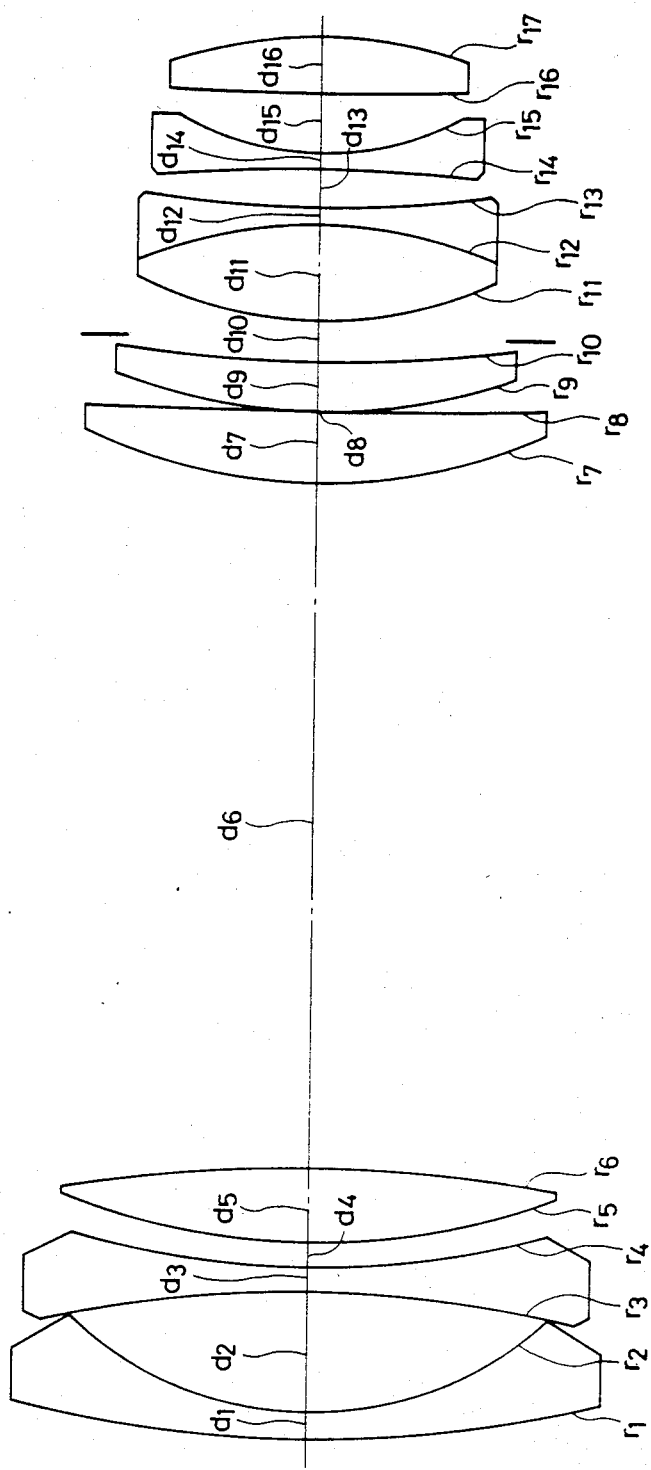
FIG. 1 shows a sectional view illustrating the composition of the zoom lens system according to the present invention.

Now, numerical data of the zoom lens system will be described as preferred embodiments of the present invention:

| Embodiment 1 | | |
|---|---|---|
| $f = 36 \sim 67.9$  F/2.8 | | |
| $r_1 = 94.018$ | | |
| $d_1 = 2.5$ | $n_1 = 1.72$ | $\nu_1 = 50.25$ |
| $r_2 = 29.091$ | | |
| $d_2 = 9.8$ | | |
| $r_3 = -90.085$ | | |
| $d_3 = 1.8$ | $n_2 = 1.757$ | $\nu_2 = 47.87$ |
| $r_4 = 76.554$ | | |
| $d_4 = 2.46$ | | |
| $r_5 = 59.156$ | | |
| $d_5 = 6.0$ | $n_3 = 1.8061$ | $\nu_3 = 40.95$ |
| $r_6 = -124.841$ | | |
| $d_6 = 56.288 \sim 1.116$ | | |
| $r_7 = 43.763$ | | |
| $d_7 = 6.0$ | $n_4 = 1.62041$ | $\nu_4 = 60.27$ |
| $r_8 = 624.786$ | | |
| $d_8 = 0.1$ | | |
| $r_9 = 48.749$ | | |
| $d_9 = 4.0$ | $n_5 = 1.62041$ | $\nu_5 = 60.27$ |
| $r_{10} = 122.376$ | | |
| $d_{10} = 3.5$ | | |
| $r_{11} = 37.221$ | | |
| $d_{11} = 7.5$ | $n_6 = 1.62041$ | $\nu_6 = 60.27$ |
| $r_{12} = -42.933$ | | |
| $d_{12} = 1.55$ | $n_7 = 1.757$ | $\nu_7 = 47.87$ |
| $r_{13} = 93.708$ | | |
| $d_{13} = 2.83$ | | |
| $r_{14} = -160.760$ | | |
| $d_{14} = 1.53$ | $n_8 = 1.7552$ | $\nu_8 = 27.51$ |
| $r_{15} = 26.176$ | | |
| $d_{15} = 4.81$ | | |
| $r_{16} = 239.203$ | | |
| $d_{16} = 4.5$ | $n_9 = 1.7859$ | $\nu_9 = 44.18$ |
| $r_{17} = -42.526$ | | |
| $f_F = -82.398$ | $f_R = 51.535$ | $f_6 = 156.856$ |

| Embodiment 2 | | |
|---|---|---|
| $f = 36 \sim 67.9$  F/2.8 | | |
| $r_1 = 78.466$ | | |
| $d_1 = 2.5$ | $n_1 = 1.713$ | $\nu_1 = 53.84$ |
| $r_2 = 28.534$ | | |
| $d_2 = 9.8$ | | |
| $r_3 = -98.909$ | | |
| $d_3 = 1.8$ | $n_2 = 1.757$ | $\nu_2 = 47.87$ |
| $r_4 = 71.192$ | | |

-continued

Embodiment 2
$f = 36 \sim 67.9 \quad F/2.8$

| | | |
|---|---|---|
| $d_4 = 2.47$ | | |
| $r_5 = 56.254$ | | |
| $d_5 = 6.0$ | $n_3 = 1.8044$ | $\nu_3 = 39.58$ |
| $r_6 = -166.469$ | | |
| $d_6 = 55.874 \sim 2.453$ | | |
| $r_7 = 41.962$ | | |
| $d_7 = 4.0$ | $n_4 = 1.6228$ | $\nu_4 = 57.06$ |
| $r_8 = 390.264$ | | |
| $d_8 = 0.1$ | | |
| $r_9 = 47.444$ | | |
| $d_9 = 4.0$ | $n_5 = 1.62041$ | $\nu_5 = 60.27$ |
| $r_{10} = 131.106$ | | |
| $d_{10} = 3.5$ | | |
| $r_{11} = 38.063$ | | |
| $d_{11} = 7.5$ | $n_6 = 1.6223$ | $\nu_6 = 53.2$ |
| $r_{12} = -54.587$ | | |
| $d_{12} = 1.55$ | $n_7 = 1.7495$ | $\nu_7 = 35.27$ |
| $r_{13} = 92.907$ | | |
| $d_{13} = 2.86$ | | |
| $r_{14} = -103.514$ | | |
| $d_{14} = 1.53$ | $n_8 = 1.7552$ | $\nu_8 = 27.51$ |
| $r_{15} = 25.836$ | | |
| $d_{15} = 4.76$ | | |
| $r_{16} = 188.291$ | | |
| $d_{16} = 4.5$ | $n_9 = 1.834$ | $\nu_9 = 37.16$ |
| $r_{17} = -44.375$ | | |
| $f_F = -80.917$ | $f_R = 50.589$ | $f_6 = 146.215$ |

Embodiment 3
$f = 36 \sim 67.9 \quad F/2.8$

| | | |
|---|---|---|
| $r_1 = 84.606$ | | |
| $d_1 = 2.4$ | $n_1 = 1.72$ | $\nu_1 = 41.98$ |
| $r_2 = 28.958$ | | |
| $d_2 = 10.3$ | | |
| $r_3 = -99.294$ | | |
| $d_3 = 1.5$ | $n_2 = 1.713$ | $\nu_2 = 53.84$ |
| $r_4 = 77.358$ | | |
| $d_4 = 2.50$ | | |
| $r_5 = 57.182$ | | |
| $d_5 = 6.0$ | $n_3 = 1.8044$ | $\nu_3 = 39.58$ |
| $r_6 = -202.633$ | | |
| $d_6 = 55.037 \sim 0.950$ | | |
| $r_7 = 89.584$ | | |
| $d_7 = 4.0$ | $n_4 = 1.62041$ | $\nu_4 = 60.27$ |
| $r_8 = -199.000$ | | |
| $d_8 = 0.1$ | | |
| $r_9 = 34.003$ | | |
| $d_9 = 4.0$ | $n_5 = 1.617$ | $\nu_5 = 62.79$ |
| $r_{10} = 94.166$ | | |
| $d_{10} = 5.0$ | | |
| $r_{11} = 40.259$ | | |
| $d_{11} = 7.5$ | $n_6 = 1.62041$ | $\nu_6 = 60.27$ |
| $r_{12} = -50.000$ | | |
| $d_{12} = 1.36$ | $n_7 = 1.757$ | $\nu_7 = 47.87$ |
| $r_{13} = 109.866$ | | |
| $d_{13} = 2.51$ | | |
| $r_{14} = -197.478$ | | |
| $d_{14} = 1.30$ | $n_8 = 1.7552$ | $\nu_8 = 27.51$ |
| $r_{15} = 25.877$ | | |
| $d_{15} = 4.50$ | | |
| $r_{16} = 800.289$ | | |
| $d_{16} = 4.83$ | $n_9 = 1.7859$ | $\nu_9 = 44.18$ |
| $r_{17} = -40.588$ | | |
| $f_F = -82.196$ | $f_R = 50.421$ | $f_6 = 152.821$ |

Embodiment 4
$f = 36 \sim 67.9 \quad F/2.8$

| | | |
|---|---|---|
| $r_1 = 85.032$ | | |
| $d_1 = 2.37$ | $n_1 = 1.72$ | $\nu_1 = 50.25$ |
| $r_2 = 28.635$ | | |
| $d_2 = 9.8$ | | |
| $r_3 = -123.743$ | | |
| $d_3 = 1.71$ | $n_2 = 1.757$ | $\nu_2 = 47.87$ |
| $r_4 = 70.097$ | | |
| $d_4 = 2.91$ | | |
| $r_5 = 55.979$ | | |
| $d_5 = 6.0$ | $n_3 = 1.8044$ | $\nu_3 = 39.58$ |
| $r_6 = -230.909$ | | |
| $d_6 = 50.771 \sim 1.057$ | | |
| $r_7 = 156.575$ | | |
| $d_7 = 5.5$ | $n_4 = 1.62041$ | $\nu_4 = 60.27$ |
| $r_8 = -207.315$ | | |
| $d_8 = 0.1$ | | |
| $r_9 = 36.804$ | | |
| $d_9 = 3.86$ | $n_5 = 1.62041$ | $\nu_5 = 60.27$ |
| $r_{10} = 213.479$ | | |
| $d_{10} = 3.83$ | | |
| $r_{11} = 36.804$ | | |
| $d_{11} = 7.5$ | $n_6 = 1.62041$ | $\nu_6 = 60.27$ |
| $r_{12} = -45.120$ | | |
| $d_{12} = 1.51$ | $n_7 = 1.757$ | $\nu_7 = 47.87$ |
| $r_{13} = 129.016$ | | |
| $d_{13} = 3.62$ | | |
| $r_{14} = 33.29.514$ | | |
| $d_{14} = 1.48$ | $n_8 = 1.7847$ | $\nu_8 = 26.22$ |
| $r_{15} = 24.486$ | | |
| $d_{15} = 24.486$ | | |
| $r_{16} = -612.618$ | | |
| $d_{16} = 4.34$ | $n_9 = 1.8044$ | $\nu_9 = 39.58$ |
| $r_{17} = -42.041$ | | |
| $f_F = -76.541$ | $f_R = 49.856$ | $f_6 = 114.580$ | wherein the reference symbols $r_1$ through $r_{17}$ represent radii of curvature on the surfaces of the respective lens elements, the reference symbols $d_1$ through $d_{16}$ designate thicknesses of the respective lens elements and airspaces reserved therebetween, the reference symbols $n_1$ through $n_9$ denote refractive indices of the respective lens elements, the reference symbols $\nu_1$ through $\nu_9$ represent Abbe's numbers of the respective lens elements and the reference symbol f designates focal length of the zoom lens system as a whole.

Out of the Embodiments described above, the stop is arranged at a location 2 mm on the image side as measured from the lens surface $r_{10}$ in Embodiments 1 and 2. The stop is arranged at a location 3 mm on the image side as measured from the lens surface $r_{10}$ in Embodiment 3.

Figure 2:
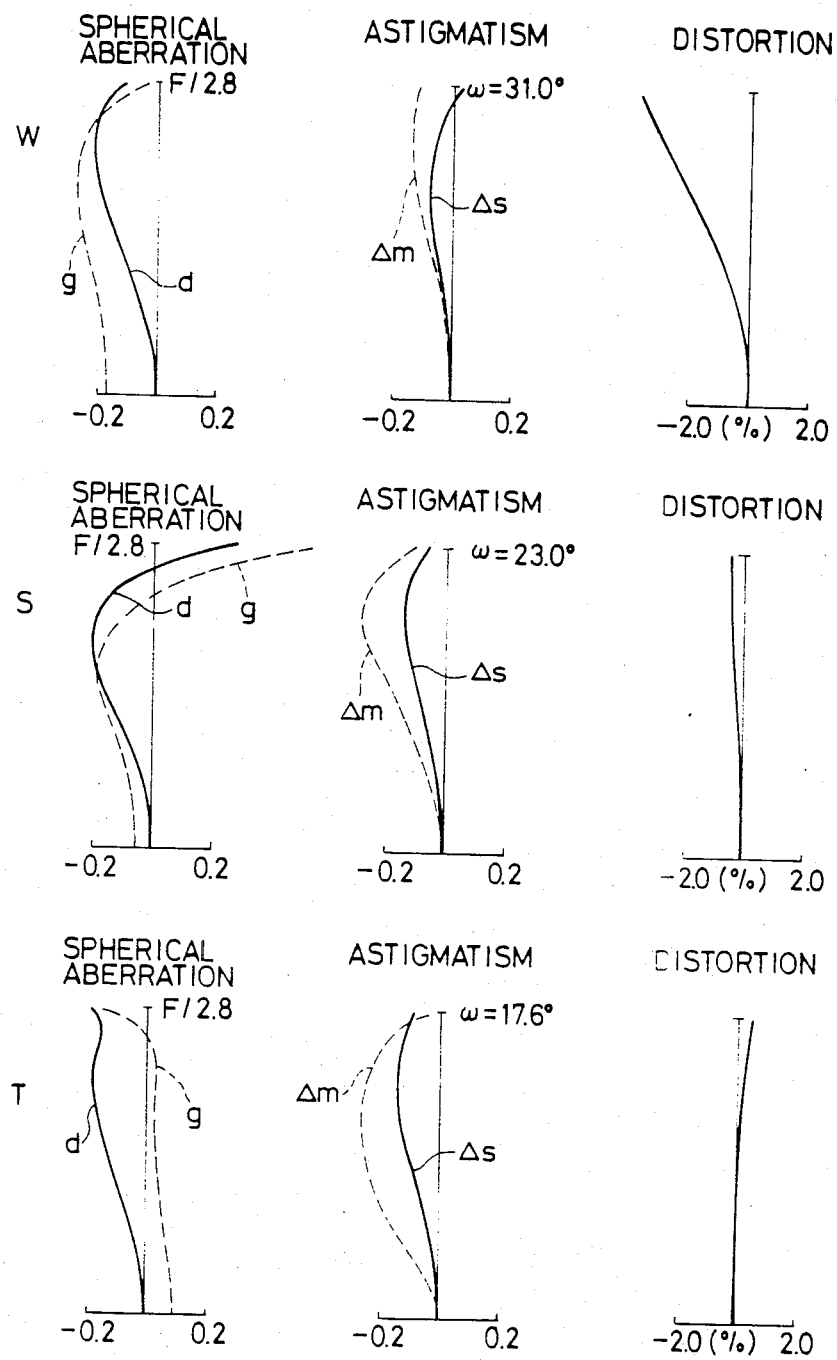
FIG. 2 through FIG. 5 show curves illustrating aberration characteristics of Embodiments 1 through 4 of the zoom lens system according to the present invention.
Figure 3:
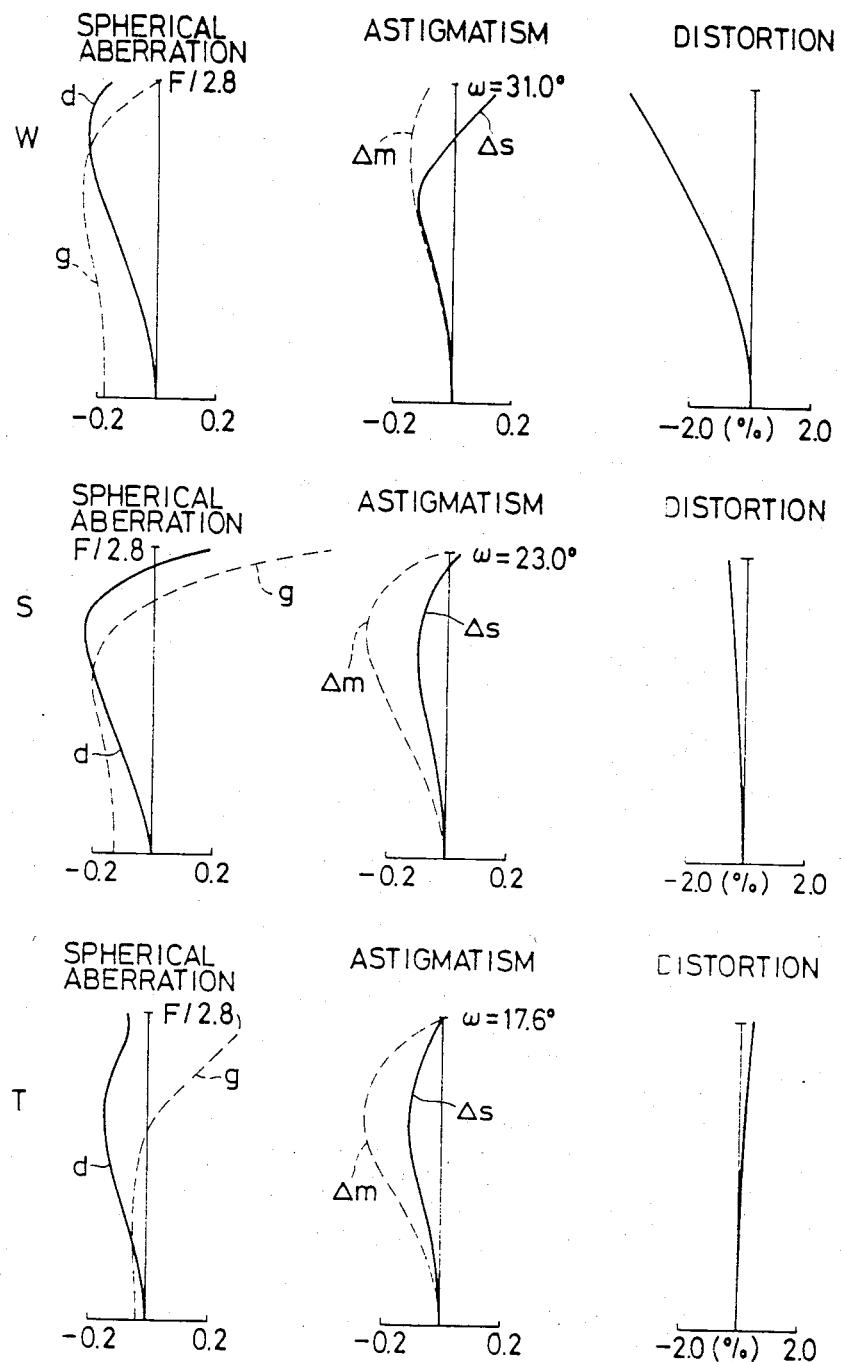
Figure 4:
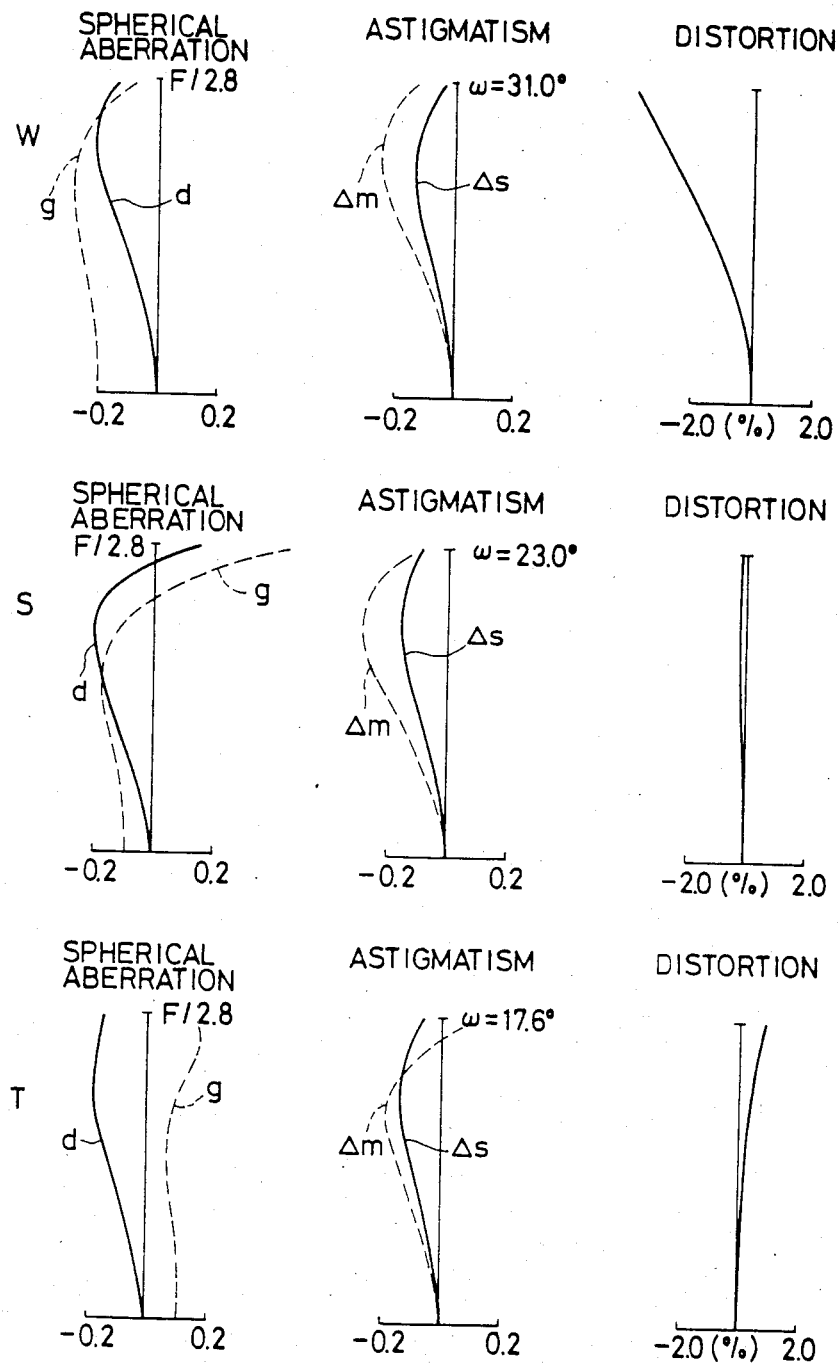
Figure 5:
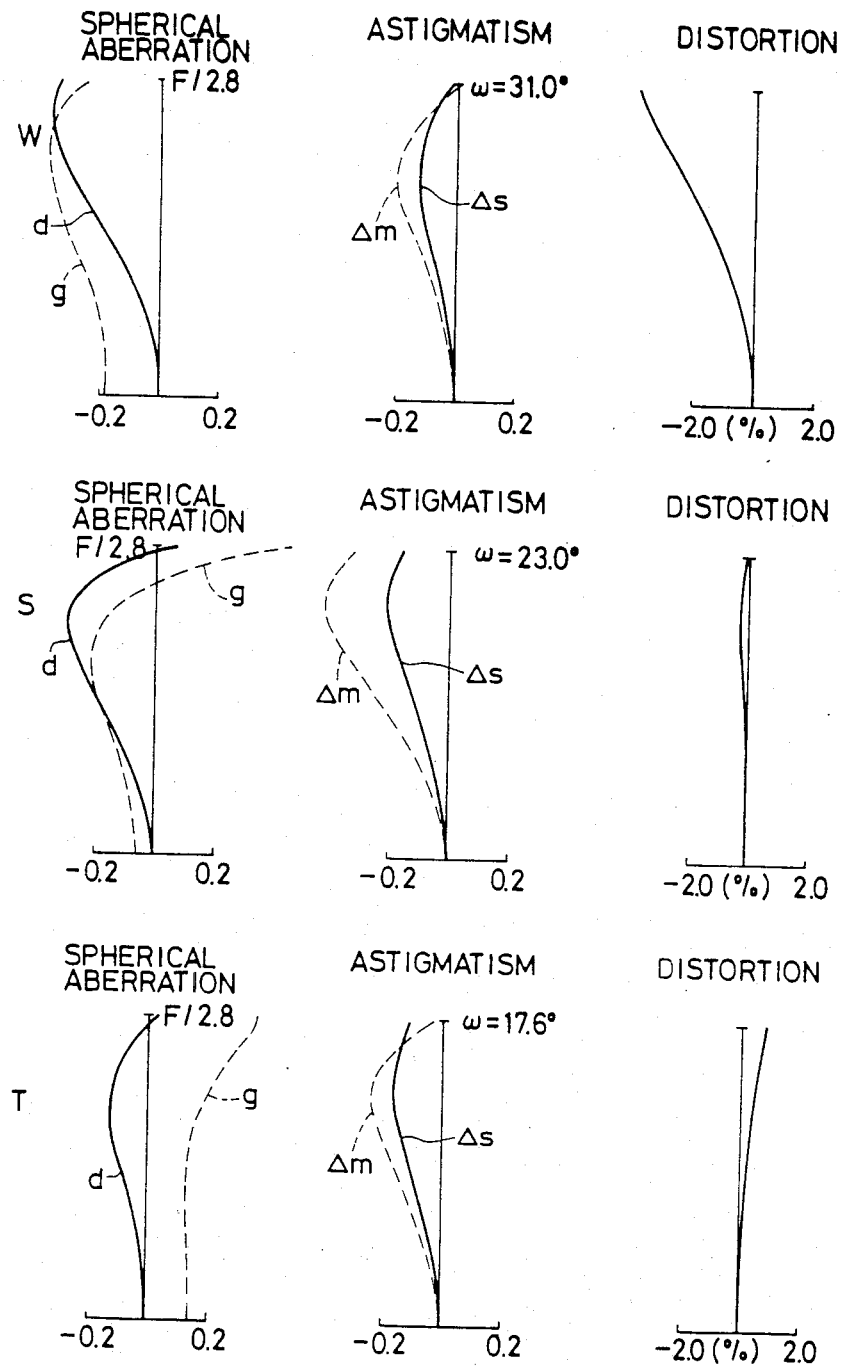

The stop is arranged at a location 1.93 mm on the image side as measured from the lens surface $r_{10}$ in Embodiment 4. Aberration characteristics of these Embodiments are illustrated in FIG. 2 through FIG. 5, in which reference symbol W, S and T represent the wide position (f=36), standard position (f=51.95) and tele position (f=67.9) respectively.

I claim:

1. A zoom lens system comprising a front lens group having negative refractive power and a rear lens group having positive refractive power, said rear lens group consisting of a positive lens component, a positive meniscus lens component having a convex surface on the object side, a positive meniscus cemented doublet composed of a biconvex lens element and a biconcave lens element, a negative lens component and a positive lens component, said zoom lens system being so adapted as to perform zooming by varying the airspace reserved between said front and rear lens groups, and to satisfy the following conditions (1) and (2):

$$0.47 < r_{15}/f_R < 0.53 \qquad (1)$$

$$0.1 < n_7 - n_6 \quad (2)$$

wherein the reference symbol $r_{15}$ represents radius of curvature on the image side surface of the negative lens element arranged in said rear lens group, the reference symbols $n_6$ and $n_7$ designate refractive indices of both the lens elements respectively of the positive meniscus cemented doublet arranged in said rear lens group and the reference symbol $f_R$ denotes focal length of said rear lens group.

2. A zoom lens system according to claim 1 satisfying the following additional conditions (3) through (7):

$$1.1 < |f_F|/f_T < 1.24 \quad (3)$$

$$2.15 < f_6/f_R < 3.2 \quad (4)$$

$$0.3 < D/f_R < 0.6 \quad (5)$$

$$10 < \nu_6 - \nu_7 < 25 \quad (6)$$

$$50 < \nu_4, \nu_5, \nu_6 \quad (7)$$

wherein the reference symbol D represents distance as measured from the object side surface of the positive meniscus cemented doublet to the image side surface of the positive lens component arranged on the extreme image side, the reference symbols $\nu_4$, $\nu_5$, $\nu_6$ and $\nu_7$ denote Abbe's numbers of the object side positive lens component, positive meniscus lens component and both the lens elements of the positive meniscus cemented doublet respectively arranged in said rear lens group, the reference symbol $f_6$ represents focal length of the positive meniscus cemented doublet arranged in said rear lens group, the reference symbol $f_F$ designates focal length of said front lens group and the reference symbol $f_T$ denotes focal length of said zoom lens system as a whole at its tele position.

3. A zoom lens system according to claim 2 wherein said front lens group consists of a negative meniscus lens component, a negative lens component and a positive lens component.

4. A zoom lens system according to claim 3 having the following numerical data:

| f = 36~67.9   F/2.8 | | |
| --- | --- | --- |
| $r_1 = 94.018$ | | |
| $d_1 = 2.5$ | $n_1 = 1.72$ | $\nu_1 = 50.25$ |
| $r_2 = 29.091$ | | |
| $d_2 = 9.8$ | | |
| $r_3 = -90.085$ | | |
| $d_3 = 1.8$ | $n_2 = 1.757$ | $\nu_2 = 47.87$ |
| $r_4 = 76.554$ | | |
| $d_4 = 2.46$ | | |
| $r_5 = 59.156$ | | |
| $d_5 = 6.0$ | $n_3 = 1.8061$ | $\nu_3 = 40.95$ |
| $r_6 = -124.841$ | | |
| $d_6 = 56.288 \sim 1.116$ | | |
| $r_7 = 43.763$ | | |
| $d_7 = 6.0$ | $n_4 = 1.62041$ | $\nu_4 = 60.27$ |
| $r_8 = 624.786$ | | |
| $d_8 = 0.1$ | | |
| $r_9 = 48.749$ | | |
| $d_9 = 4.0$ | $n_5 = 1.62041$ | $\nu_5 = 60.27$ |
| $r_{10} = 122.376$ | | |
| $d_{10} = 3.5$ | | |
| $r_{11} = 37.221$ | | |
| $d_{11} = 7.5$ | $n_6 = 1.62041$ | $\nu_6 = 60.27$ |
| $r_{12} = -42.933$ | | |
| $d_{12} = 1.55$ | $n_7 = 1.757$ | $\nu_7 = 47.87$ |
| $r_{13} = 93.708$ | | |
| $d_{13} = 2.83$ | | |
| $r_{14} = -160.760$ | | |

-continued

| f = 36~67.9   F/2.8 | | |
| --- | --- | --- |
| $d_{14} = 1.53$ | $n_8 = 1.7552$ | $\nu_8 = 27.51$ |
| $r_{15} = 26.176$ | | |
| $d_{15} = 4.81$ | | |
| $r_{16} = 239.203$ | | |
| $d_{16} = 4.5$ | $n_9 = 1.7859$ | $\nu_9 = 44.18$ |
| $r_{17} = -42.526$ | | |
| $f_F = -82.398$ | $f_R = 51.535$ | $f_6 = 156.856$ | wherein the reference symbol f represents focal length of said zoom lens system as a whole, the reference symbols $r_1$ through $r_{17}$ designate radii of curvature on the surfaces of the respective lens elements, the reference symbols $d_1$ through $d_{16}$ denote thicknesses og the respective lens elements and airspaces reserved therebetween, the reference symbols $n_1$ through $n_9$ represent refractive indices of the respective lens elements and the reference symbols $\nu_1$ through $\nu_9$ designate Abbe's numbers of the respective lens elements.

5. A zoom lens system according to claim 3 having the following numerical data:

| f = 36~67.9   F/2.8 | | |
| --- | --- | --- |
| $r_1 = 78.466$ | | |
| $d_1 = 2.5$ | $n_1 = 1.713$ | $\nu_1 = 53.84$ |
| $r_2 = 28.534$ | | |
| $d_2 = 9.8$ | | |
| $r_3 = -98.909$ | | |
| $d_3 = 1.8$ | $n_2 = 1.757$ | $\nu_2 = 47.87$ |
| $r_4 = 71.192$ | | |
| $d_4 = 2.47$ | | |
| $r_5 = 56.254$ | | |
| $d_5 = 6.0$ | $n_3 = 1.8044$ | $\nu_3 = 39.58$ |
| $r_6 = -166.469$ | | |
| $d_6 = 55.874 \sim 2.543$ | | |
| $r_7 = 41.962$ | | |
| $d_7 = 4.0$ | $n_4 = 1.6228$ | $\nu_4 = 57.06$ |
| $r_8 = 390.264$ | | |
| $d_8 = 0.1$ | | |
| $r_9 = 47.444$ | | |
| $d_9 = 4.0$ | $n_5 = 1.62041$ | $\nu_5 = 60.27$ |
| $r_{10} = 131.106$ | | |
| $d_{10} = 3.5$ | | |
| $r_{11} = 38.063$ | | |
| $d_{11} = 7.5$ | $n_6 = 1.6223$ | $\nu_6 = 53.2$ |
| $r_{12} = -54.587$ | | |
| $d_{12} = 1.55$ | $n_7 = 1.7495$ | $\nu_7 = 35.27$ |
| $r_{13} = 92.907$ | | |
| $d_{13} = 2.86$ | | |
| $r_{14} = -103.514$ | | |
| $d_{14} = 1.53$ | $n_8 = 1.7552$ | $\nu_8 = 27.51$ |
| $r_{15} = 25.836$ | | |
| $d_{15} = 4.76$ | | |
| $r_{16} = 188.291$ | | |
| $d_{16} = 4.5$ | $n_9 = 1.834$ | $\nu_9 = 37.16$ |
| $r_{17} = -44.375$ | | |
| $f_F = -80.917$ | $f_R = 50.589$ | $f_6 = 146.215$ | wherein the reference symbol f represents focal length of said zoom lens system as a whole, the reference symbols $r_1$ through $r_{17}$ designate radii of curvature on the surfaces of the respective lens elements, the reference symbols $d_1$ through $d_{16}$ denote thicknesses of the respective lens elements and airspaces reserved therebetween, the reference symbols $n_1$ through $n_9$ represent refractive indices of the respective lens elements and the reference symbols $\nu_1$ through $\nu_9$ designate Abbe's numbers of the respective lens elements.

6. A zoom lens system according to claim 3 having the following numerical data:

| $f = 36 \sim 67.9$ F/2.8 | | | |
|---|---|---|---|
| $r_1 = 84.606$ | | | |
| $d_1 = 2.4$ | $n_1 = 1.72$ | $\nu_1 = 41.98$ | |
| $r_2 = 28.958$ | | | |
| $d_2 = 10.3$ | | | |
| $r_3 = -99.294$ | | | |
| $d_3 = 1.5$ | $n_2 = 1.713$ | $\nu_2 = 53.84$ | |
| $r_4 = 77.358$ | | | |
| $d_4 = 2.50$ | | | |
| $r_5 = 6.0$ | | | |
| $d_5 = 6.0$ | $n_3 = 1.8044$ | $\nu_3 = 39.58$ | |
| $r_6 = -202.633$ | | | |
| $d_6 = 55.037 \sim 0.950$ | | | |
| $r_7 = 89.584$ | | | |
| $d_7 = 4.0$ | $n_4 = 1.62041$ | $\nu_4 = 60.27$ | |
| $r_8 = -199.000$ | | | |
| $d_8 = 0.1$ | | | |
| $r_9 = 34.003$ | | | |
| $d_9 = 4.0$ | $n_5 = 1.617$ | $\nu_5 = 62.79$ | |
| $r_{10} = 94.166$ | | | |
| $d_{10} = 5.0$ | | | |
| $r_{11} = 40.259$ | | | |
| $d_{11} = 7.5$ | $n_6 = 1.62041$ | $\nu_6 = 60.27$ | |
| $r_{12} = -50.000$ | | | |
| $d_{12} = 1.36$ | $n_7 = 1.757$ | $\nu_7 = 47.87$ | |
| $r_{13} = 109.866$ | | | |
| $d_{13} = 2.51$ | | | |
| $r_{14} = -197.478$ | | | |
| $d_{14} = 1.30$ | $n_8 = 1.7552$ | $\nu_8 = 27.51$ | |
| $r_{15} = 25.877$ | | | |
| $d_{15} = 4.50$ | | | |
| $r_{16} = 800.289$ | | | |
| $d_{16} = 4.83$ | $n_9 = 1.7859$ | $\nu_9 = 44.18$ | |
| $r_{17} = -40.588$ | | | |
| $f_F = -82.196$ | $f_R = 50.421$ | $f_6 = 152.821$ | | wherein the reference symbol f represents focal length of said zoom lens system as a whole, the reference symbols $r_1$ through $r_{17}$ designate radii of curvature on the surfaces of the respective lens elements, the reference symbols $d_1$ through $d_{16}$ denote thickneeses of the respective lens elements and airspaces reserved therebetween, the reference symbols $n_1$ through $n_9$ represent refractive indices of the respective lens elements and the reference symbols $\nu_1$ through $\nu_9$ designate Abbe's numbers of the respective lens elements.

7. A zoom lens system according to claim 3 having the following numerical data:

| $f = 36 \sim 67.9$ F/2.8 | | | |
|---|---|---|---|
| $r_1 = 85.032$ | | | |
| $d_1 = 2.37$ | $n_1 = 1.72$ | $\nu_1 = 50.25$ | |
| $r_2 = 28.635$ | | | |
| $d_2 = 9.8$ | | | |
| $r_3 = -123.743$ | | | |
| $d_3 = 1.71$ | $n_2 = 1.757$ | $\nu_2 = 47.87$ | |
| $r_4 = 70.097$ | | | |
| $d_4 = 2.91$ | | | |
| $r_5 = 55.979$ | | | |
| $d_5 = 6.0$ | $n_3 = 1.8044$ | $\nu_3 = 39.58$ | |
| $r_6 = -230.909$ | | | |
| $d_6 = 50.771 \sim 1.057$ | | | |
| $r_7 = 156.575$ | | | |
| $d_7 = 5.5$ | $n_4 = 1.62041$ | $\nu_4 = 60.27$ | |
| $r_8 = -207.315$ | | | |
| $d_8 = 0.1$ | | | |
| $r_9 = 36.804$ | | | |
| $d_9 = 3.86$ | $n_5 = 1.62041$ | $\nu_5 = 60.27$ | |
| $r_{10} = 213.479$ | | | |
| $d_{10} = 3.38$ | | | |
| $r_{11} = 36.804$ | | | |
| $d_{11} = 7.5$ | $n_6 = 1.62041$ | $\nu_6 = 60.27$ | |
| $r_{12} = -45.120$ | | | |
| $d_{12} = 1.51$ | $n_7 = 1.757$ | $\nu_7 = 47.87$ | |
| $r_{13} = 129.016$ | | | |
| $d_{13} = 3.62$ | | | |
| $r_{14} = 3329.514$ | | | |
| $d_{14} = 1.48$ | $n_8 = 1.7847$ | $\nu_8 = 26.22$ | |
| $r_{15} = 24.486$ | | | |
| $d_{15} = 5.00$ | | | |
| $r_{16} = -612.618$ | | | |
| $d_{16} = 4.34$ | $n_9 = 1.8044$ | $\nu_9 = 39.58$ | |
| $r_{17} = -42.041$ | | | |
| $f_F = -76.541$ | $f_R = 49.586$ | $f_6 = 114.580$ | | wherein the reference symbol f represents focal length of said zoom lens system as a whole, the reference symbols $r_1$ through $r_{17}$ designate radii of curvature on the surfaces of the respective lens elements, the reference symbols $d_1$ through $d_{16}$ denote thicknesses of the respective lens elements and airspaces reserved therebetween, the reference symbols $n_1$ through $n_9$ represent refractive indices of the respective lens elements and the reference symbols $\nu_1$ through $\nu_9$ designate Abbe's numbers of the respective lens elements.

* * * * *